(12) United States Patent
Hasegawa

(10) Patent No.: US 12,509,770 B2
(45) Date of Patent: Dec. 30, 2025

(54) FILM FORMING METHOD AND FILM FORMING APPARATUS

(71) Applicant: Tokyo Electron Limited, Tokyo (JP)

(72) Inventor: Toshio Hasegawa, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 99 days.

(21) Appl. No.: 18/245,771

(22) PCT Filed: Sep. 15, 2021

(86) PCT No.: PCT/JP2021/033912
§ 371 (c)(1),
(2) Date: Mar. 17, 2023

(87) PCT Pub. No.: WO2022/070918
PCT Pub. Date: Apr. 7, 2022

(65) Prior Publication Data
US 2023/0392258 A1    Dec. 7, 2023

(30) Foreign Application Priority Data
Sep. 29, 2020  (JP) ................................. 2020-163170

(51) Int. Cl.
*C23C 16/455*  (2006.01)
*C23C 16/32*  (2006.01)
*C23C 16/52*  (2006.01)

(52) U.S. Cl.
CPC ........ *C23C 16/45517* (2013.01); *C23C 16/32* (2013.01); *C23C 16/52* (2013.01)

(58) Field of Classification Search
CPC ..................................................... C23C 16/32
See application file for complete search history.

(56) References Cited

U.S. PATENT DOCUMENTS

2004/0266217 A1\* 12/2004 Kim ..................... H01L 21/3142
438/785
2019/0348515 A1\* 11/2019 Li ....................... H01L 29/4966

FOREIGN PATENT DOCUMENTS

JP          2014-116517 A       6/2014

\* cited by examiner

*Primary Examiner* — Robert A Vetere
(74) *Attorney, Agent, or Firm* — Armstrong Teasdale LLP

(57) ABSTRACT

A film forming method for forming a metal carbide film on a substrate, includes: forming a metal carbide film including a first metal element and a second metal element different from the first metal element on the substrate by performing, multiple times in a time-sharing manner: supplying a first precursor gas including the first metal element and not including carbon to the substrate; supplying a second precursor gas including the second metal element and including carbon to the substrate; and supplying a reducing agent to the substrate, wherein concentrations of the first metal element and the second metal element included in the metal carbide film are controlled by adjusting the order of the supplying the first precursor gas, the supplying the second precursor gas, and the supplying the reducing agent.

6 Claims, 3 Drawing Sheets

FIG. 3

|  | XPS [at%] | | |
| --- | --- | --- | --- |
|  | Ti | Al | C |
| Condition 1 | 21 | 21 | 58 |
| Condition 2 | 29 | 17 | 54 |
| Condition 3 | 17 | 31 | 52 |

FILM FORMING METHOD AND FILM FORMING APPARATUS

CROSS-REFERENCE TO RELATED APPLICATIONS

The present application is a U.S. National Stage Entry of International Patent Application No. PCT/JP2021/033912, filed Sep. 15, 2021, which claims the benefit of priority to Japanese Patent Application No. 2020-163170, filed Sep. 29, 2020, each of which is hereby incorporated herein by reference in its entirety.

TECHNICAL FIELD

The present disclosure relates to a film forming method and a film forming apparatus.

BACKGROUND

When forming a $HfSiO_x$ film, a technique for controlling the number of repetitions of a step of adsorbing Hf and the number of repetitions of a step of adsorbing Si according to the target composition ratio of Hf and Si is known (see, e.g., Patent Document 1).

PRIOR ART DOCUMENTS

Patent Documents

Patent Document 1: Japanese Laid-Open Publication No. 2014-116517

The present disclosure provides some embodiments of a technique capable of controlling compositions of dissimilar metals in a film.

SUMMARY

According to one embodiment of the present disclosure, a film forming method for forming a metal carbide film on a substrate includes: forming a metal carbide film including a first metal element and a second metal element different from the first metal element on the substrate by performing, multiple times in a time-sharing manner: supplying a first precursor gas including the first metal element and not including carbon to the substrate; supplying a second precursor gas including the second metal element and including carbon to the substrate; and supplying a reducing agent to the substrate, wherein the concentrations of the first metal element and the second metal element included in the metal carbide film are controlled by adjusting the order of the supplying the first precursor gas, the supplying the second precursor gas, and the supplying the reducing agent.

According to the present disclosure, it is possible to control the compositions of dissimilar metals in a film.

BRIEF DESCRIPTION OF DRAWINGS

FIG. 3 is a diagram showing results of composition analysis of a TiAlC film.

DETAILED DESCRIPTION

Figure 1:
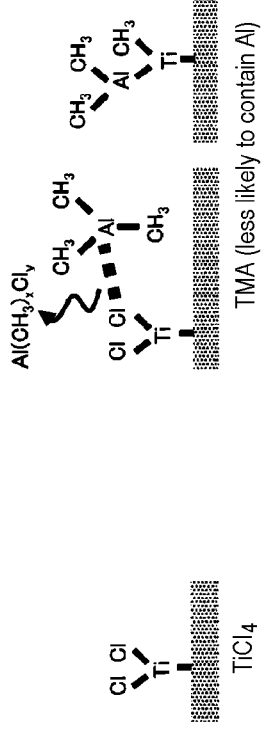
FIG. 1 is a view for explaining a mechanism of composition control by a film forming method according to an embodiment.
Figure 1:
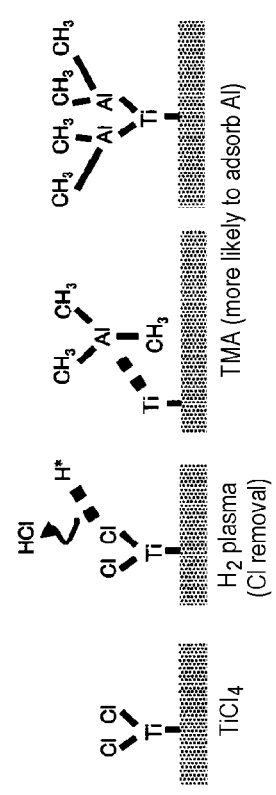
Figure 1:
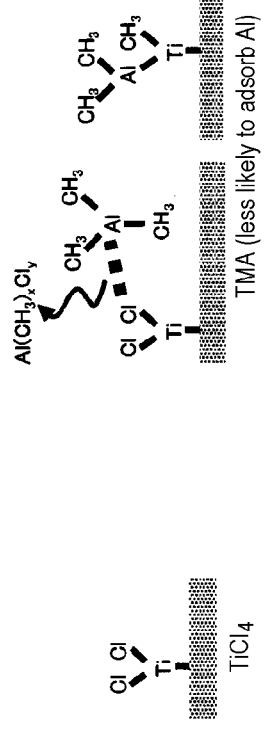

Non-limiting exemplary embodiments of the present disclosure will now be described with reference to the accompanying drawings. Throughout the accompanying drawings, the same or corresponding members or parts are denoted by the same or corresponding reference numerals, and explanation thereof will not be repeated.

[Film Forming Method]

An example of a film forming method according to an embodiment will be described. The film forming method of the embodiment forms a TiAlC film on a substrate by performing a $TiCl_4$ gas supplying step S11, a purging step S12, a TMA gas supplying step S13, a purging step S14, and a $H_2$ plasma processing step S15 multiple times in a time-sharing manner. In the film forming method of the embodiment, the concentrations of Ti and Al in the TiAlC film are controlled by adjusting the order of performing the $TiCl_4$ gas supplying step S11, the TMA gas supplying step S13, and the $H_2$ plasma processing step S15. The substrate may be, for example, a semiconductor wafer such as a silicon wafer and the like.

In the $TiCl_4$ gas supplying step S1, a $TiCl_4$ gas is supplied to the substrate accommodated in a process container to adsorb $TiCl_4$ on the substrate. In the purging step S12, the $TiCl_4$ gas and the like remaining in the process container are removed. In the TMA gas supplying step S13, a TMA[Al$(CH_3)_3$] gas is supplied to the substrate accommodated in the process container to adsorb TMA on the surface of $TiCl_4$. In the purging step S14, the TMA gas and the like remaining in the process container are removed. In the $H_2$ plasma processing step S15, by exposing the substrate having $TiCl_4$ adsorbed on the surface of the substrate to $H_2$ plasma, Cl on the surface of the substrate reacts with H radicals (H*) contained in the $H_2$ plasma to desorb Cl from the surface as HCl. Further, in the $H_2$ plasma processing step S15, by exposing the substrate having TMA adsorbed on the surface of the substrate to the $H_2$ plasma, $CH_3$ on the surface of the substrate reacts with the H radicals (H*) contained in the $H_2$ plasma to desorb H of $CH_3$ from the surface as $H_2$.

For example, by performing the $H_2$ plasma processing step S15 after the TMA gas supplying step S13 and before the $TiCl_4$ gas supplying step S11, a TiAlC film having a low Al concentration can be formed as compared with a case where the $H_2$ plasma processing step S15 is not performed. That is, by repeating a cycle in which the $TiCl_4$ gas supplying step S11, the purging step S12, the TMA gas supplying step S13, the purging step S14, and the $H_2$ plasma processing step S15 are performed in this order, the TiAlC film having a low Al concentration can be formed as compared with the case where the $H_2$ plasma processing step S15 is not performed.

Further, for example, by performing the $H_2$ plasma processing step S15 after the $TiCl_4$ gas supplying step S11 and before the TMA gas supplying step S13, a TiAlC film having a high Al concentration can be formed as compared with the case where the $H_2$ plasma processing step S15 is not performed. That is, by repeating a cycle in which the $TiCl_4$ gas supplying step S11, the purging step S12, the $H_2$ plasma processing step S15, the TMA gas supplying step S13, and the purging step S14 are performed in this order, the TiAlC film having a high Al concentration can be formed as compared with the case where the $H_2$ plasma processing step S15 is not performed.

As described above, according to the film forming method of the embodiment, the concentrations of Ti and Al in the TiAlC film are controlled by adjusting the order of performing the TiCl$_4$ gas supplying step S11, the TMA gas supplying step S13, and the H$_2$ plasma processing step S15. Thereby, the compositions of Ti and Al in the TiAlC film can be controlled. As a result, the work function of the TiAlC film can be controlled. For example, the work function of the TiAlC film can be decreased by increasing the Al concentration in the TiAlC film, and the work function of the TiAlC film can be increased by decreasing the Al concentration in the TiAlC film.

(Mechanism)

A mechanism by which the compositions of Ti and Al in the TiAlC film can be controlled by the film forming method of the embodiment will be described with reference to FIG. 1.

A surface reaction when TiCl$_4$ gas supply and TMA gas supply without H$_2$ plasma processing are alternately repeated will be described with reference to the upper part of FIG. 1. First, TiCl$_4$ is adsorbed on the surface of the substrate by supplying a TiCl$_4$ gas to the substrate. Subsequently, by supplying a TMA gas to the substrate, TMA is adsorbed on the surface on which TiCl$_4$ is adsorbed. At this time, if Ti on the surface of the substrate is Cl-terminated, Cl on the surface reacts with Al in the TMA gas to be desorbed as Al(Cl$_3$)$_x$Cl$_y$. Therefore, the Al content of the surface is reduced. Subsequently, by supplying a TiCl$_4$ gas to the substrate, TiCl$_4$ is adsorbed on the surface on which TMA is adsorbed. At this time, if Al is terminated with CH$_3$ on the surface of the substrate, CH$_3$ on the surface inhibits the adsorption of TiCl$_4$. Therefore, the Ti content of the surface is reduced.

A surface reaction when TiCl$_4$ gas supply, H$_2$ plasma processing, and TMA gas supply are repeated in this order will be described with reference to the middle part of FIG. 1. First, TiCl$_4$ is adsorbed on the surface of the substrate by supplying a TiCl$_4$ gas to the substrate. Subsequently, the substrate is exposed to H$_2$ plasma. At this time, if Ti is terminated with Cl on the surface of the substrate, Cl on the surface reacts with H radicals (H*) contained in the H$_2$ plasma to be desorbed as HCl. Therefore, dangling bonds are generated on the surface. Subsequently, by supplying a TMA gas to the substrate, TMA is adsorbed on the surface where the dangling bonds are generated. At this time, Ti exposed by the desorption of Cl reacts with Al in the TMA gas to form a strong bond on the surface of the substrate. Therefore, even if Cl constituting TiCl$_4$ comes in contact with Al in the subsequent TiCl$_4$ gas supply, Al is less likely to be desorbed. Subsequently, by supplying a TiCl$_4$ gas to the substrate, TiCl$_4$ is adsorbed on the surface on which TMA is adsorbed. At this time, if Al is terminated with CH$_3$ on the surface of the substrate, CH$_3$ on the surface inhibits the adsorption of TiCl$_4$. Therefore, the Ti content on the surface is reduced. By repeating the TiCl$_4$ gas supply, the H$_2$ plasma processing, and the TMA gas supply in this order, the amount of adsorption of Al on the surface increases, whereas the amount of adsorption of Ti on the surface decreases. As a result, a TiAlC film having a high Al concentration can be formed as compared with the case where the TiCl$_4$ gas supply and the TMA gas supply are alternately repeated without H$_2$ plasma processing.

A surface reaction when TiCl$_4$ gas supply, TMA gas supply, and H$_2$ plasma processing are repeated in this order will be described with reference to the lower part of FIG. 1. First, TiCl$_4$ is adsorbed on the surface of the substrate by supplying a TiCl$_4$ gas to the substrate. Subsequently, by supplying a TMA gas to the substrate, TMA is adsorbed on the surface on which TiCl$_4$ is adsorbed. At this time, if Ti is terminated with Cl on the surface of the substrate, Cl on the surface reacts with Al in the TMA gas to be desorbed as Al(Cl$_3$)$_x$Cl$_y$. Therefore, the Al content of the surface is reduced. Subsequently, the substrate is exposed to H$_2$ plasma. At this time, if Al is terminated with CH$_3$ on the surface of the substrate, CH$_3$ on the surface reacts with H radicals (H*) contained in the H$_2$ plasma to be desorbed as H$_2$. Therefore, the CH$_3$ termination on the surface becomes a CH$_x$ (where x is 1 or 2) termination. Subsequently, by supplying a TiCl$_4$ gas to the substrate, TiCl$_4$ is adsorbed on the surface on which TMA is adsorbed. At this time, since the CH$_3$ termination on the surface of the substrate is the CH$_x$ termination, TiCl$_4$ is more likely to be adsorbed. That is, the Ti content on the surface increases. As a result, a TiAlC film having a low Al concentration can be formed as compared with the case where the TiCl$_4$ gas supply and the TMA gas supply are alternately repeated without H$_2$ plasma processing.

(Film Forming Apparatus)

Figure 2:
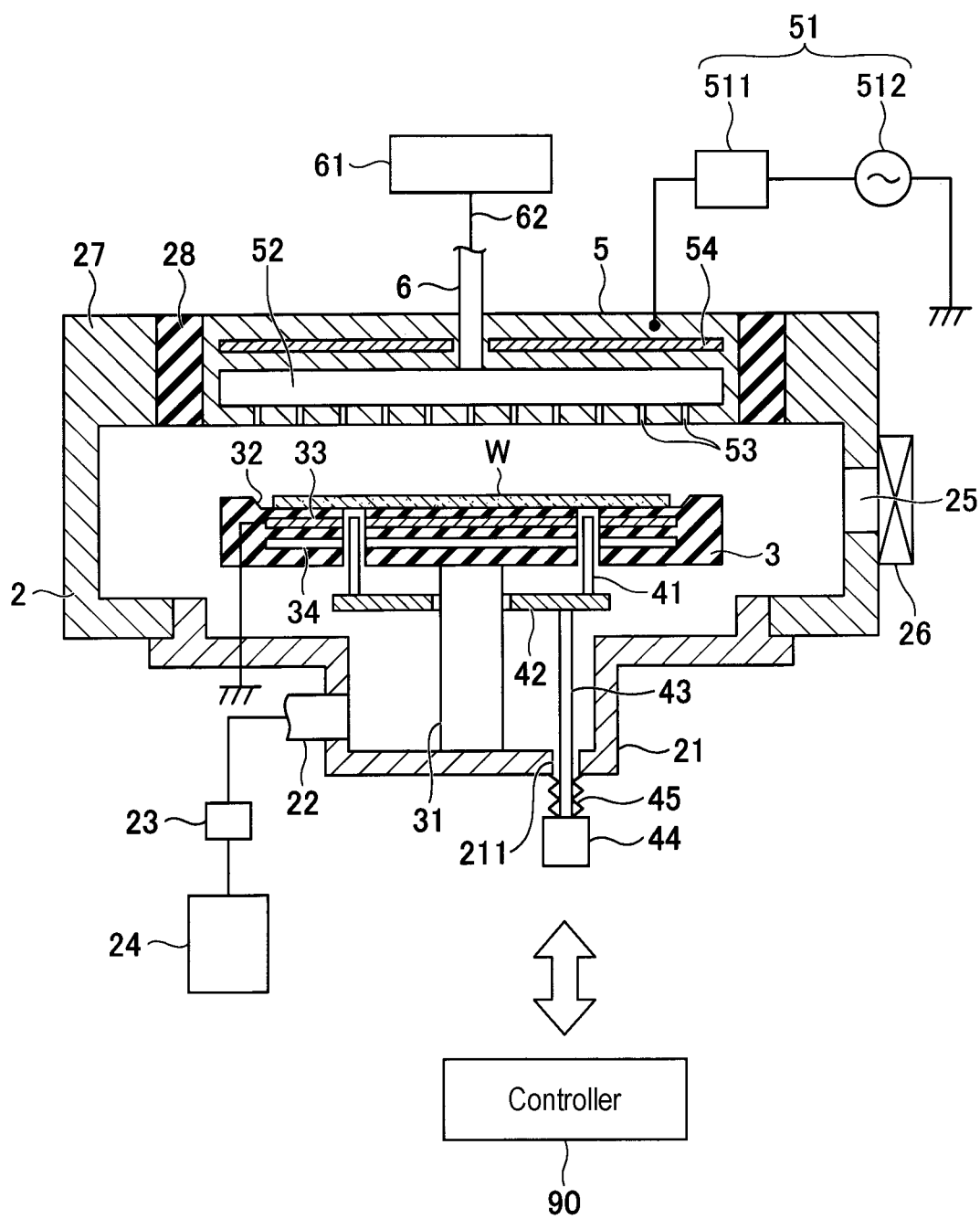
FIG. 2 is a schematic cross-sectional view showing an example of a film forming apparatus for carrying out the film forming method according to the embodiment.

An example of a film forming apparatus for carrying out the film forming method according to the embodiment will be described with reference to FIG. 2.

The film forming apparatus 1 includes a substantially cylindrical airtight process container 2. The process container 2 accommodates a substrate W therein. An exhaust chamber 21 is provided in the central portion of a bottom wall of the process container 2. The exhaust chamber 21 has, for example, a substantially cylindrical shape protruding downward. An exhaust pipe 22 is connected to the exhaust chamber 21, for example, on the side surface of the exhaust chamber 21.

An exhaust part 24 is connected to the exhaust pipe 22 via a pressure regulating part 23. The pressure regulating part 23 includes, for example, a pressure regulating valve such as a butterfly valve. The exhaust pipe 22 is configured such that the interior of the process container 2 can be decompressed by the exhaust part 24. A transfer port 25 is provided on the side surface of the process container 2. The transfer port 25 is opened/closed by a gate valve 26. The loading of the substrate W into the process container 2 and the unloading of the substrate W from the process container 2 are performed through the transfer port 25.

A stage 3 is provided in the process container 2. The stage 3 is a holder that horizontally holds the substrate W with the surface of the substrate W facing upward. The stage 3 has a substantially circular shape in a plan view and is supported by a support member 31. The surface of the stage 3 is formed with a substantially circular recess 32 for placing a substrate W having, for example, a diameter of 300 mm. The recess 32 has an inner diameter slightly larger than the diameter of the substrate W. The depth of the recess 32 is configured to be, for example, substantially the same as the thickness of the substrate W. The stage 3 is made of a ceramic material such as aluminum nitride (AlN). Further, the stage 3 may be made of a metal material such as nickel (Ni). Further, a guide ring for guiding the substrate W may be provided on the periphery of the surface of the stage 3 instead of the recess 32.

A grounded lower electrode 33, for example, is buried in the stage 3. A heating mechanism 34 is buried under the lower electrode 33. The heating mechanism 34 heats the substrate W placed on the stage 3 to a set temperature by being supplied with power from a power supply (not shown) based on a control signal from a controller 90. If the stage 3 is entirely made of metal, since the entire stage 3 functions as a lower electrode, the lower electrode 33 does not have to be buried in the stage 3. The stage 3 is provided with a plurality of lift pins (for example, three lift pins) 41 for holding and lifting the substrate W placed on the stage 3. The material of the lift pins 41 may be, for example, ceramics such as alumina ($Al_2O_3$), quartz, or the like. The lower ends of the lift pins 41 are attached to a support plate 42. The support plate 42 is connected to an elevating mechanism 44 provided outside the process container 2 via an elevating shaft 43.

The elevating mechanism 44 is installed, for example, below the exhaust chamber 21. A bellows 45 is provided between the elevating mechanism 44 and an opening 211 for the elevating shaft 43 which is formed on the lower surface of the exhaust chamber 21. The shape of the support plate 42 may be a shape that allows it to move up and down without interfering with the support member 31 of the stage 3. The lift pins 41 are configured to be vertically movable between above the surface of the stage 3 and below the surface of the stage 3 by the elevating mechanism 44.

A gas supplier 5 is provided on a ceiling wall 27 of the process container 2 via an insulating member 28. The gas supplier 5 forms an upper electrode and faces the lower electrode 33. An RF power supply 512 is connected to the gas supplier 5 via a matching device 511. The RF power supply 512 supplies RF power of, for example, 450 kHz to 100 MHz to the upper electrode (the gas supplier 5). Thereby, a radio-frequency electric field is generated between the upper electrode (the gas supplier 5) and the lower electrode 33 to generate capacitively coupled plasma. The plasma generating part 51 includes the matching device 511 and the RF power supply 512. The plasma generating part 51 is not limited to capacitively coupled plasma, and may generate other plasma such as inductively coupled plasma.

The gas supplier 5 has a hollow gas supply chamber 52. A large number of holes 53 for distributing and supplying a process gas into the process container 2 are arranged, for example, evenly on the lower surface of the gas supply chamber 52. A heating mechanism 54 is buried above, for example, the gas supply chamber 52 in the gas supplier 5. The heating mechanism 54 is heated to a set temperature by being supplied with power from a power supplier (not shown) based on a control signal from the controller 90.

One end of a gas introduction path 6 communicates with the gas supply chamber 52. The other end of the gas introduction path 6 is connected to a gas source 61 via a gas line 62. The gas source 61 includes, for example, supply sources of various process gases, mass flow controllers, and valves (none of which are shown). The various process gases include, for example, a $TiCl_4$ gas, a TMA gas, a $H_2$ gas, and a $N_2$ gas. Various gases are introduced into the gas supply chamber 52 from the gas source 61 via the gas line 62 and the gas introduction path 6.

The film forming apparatus 1 includes the controller 90. The controller 90 carries out, for example, the above-described film forming method by controlling each part of the film forming apparatus 1. The controller 90 may be, for example, a computer. Further, a computer program for operating each part of the film forming apparatus 1 is stored in a storage medium. The storage medium may be, for example, a flexible disk, a compact disc, a hard disk, a flash memory, a DVD, or the like.

Next, an example of the operation of the film forming apparatus 1 will be described.

First, the controller 90 opens the gate valve 26, transfers a substrate W into the process container 2 by a transfer mechanism (not shown), and places the substrate W on the stage 3. The substrate W is placed horizontally with its surface facing upward. The controller 90 closes the gate valve 26 after retracting the transfer mechanism from the process container 2. Next, the controller 90 heats the substrate W to a predetermined temperature by the heating mechanism 34 of the stage 3 and adjusts the interior of the process container 2 to a predetermined pressure by the pressure regulating part 23.

Next, the controller 90 controls each part of the film forming apparatus 1 to carry out the film forming method of the above-described embodiment. That is, the controller 90 controls the pressure regulating part 23, the plasma generating part 51, the gas source 61, etc. to perform the $TiCl_4$ gas supplying step S11, the purging step S12, the TMA gas supplying step S13, the purging step S14, and the $H_2$ plasma processing step S15 multiple times in a time-sharing manner. As a result, a TiAlC film is formed on the substrate W.

After the TiAlC film having a desired thickness is formed on the substrate W, the controller 90 unloads the substrate W from the process container 2 in the reverse order of loading the substrate W into the process container 2.

EXAMPLE

An Example carried out for confirming the effects of the film forming method according to the embodiment will be described with reference to FIG. 3. In the Example, a TiAlC film was formed on a substrate under the following three conditions, and the composition ratio [atm %] of titanium (Ti), aluminum (Al), and carbon (C) in the formed TiAlC film was measured by X-ray Photoelectron Spectroscopy (XPS).

Repetition of cycle of "$TiCl_4$ gas supply→purge→TMA gas supply→purge"     (Condition 1)

Repetition of cycle of "$TiCl_4$ gas supply→purge→TMA gas supply→purge→$H_2$ plasma processing"     (Condition 2)

Repetition of cycle of "$TiCl_4$ gas supply→purge→$H_2$ plasma processing→TMA gas supply→purge"     (Condition 3)

In addition, in Conditions 1 to 3, the $TiCl_4$ gas supply time was set to 0.1 seconds, the TMA gas supply time was set to 0.1 seconds, the purge time was set to 2.0 seconds, and the $H_2$ plasma processing time was set to 2.0 seconds.

FIG. 3 is a diagram showing the results of compositional analysis of the TiAlC film. As shown in FIG. 3, the TiAlC film formed under Condition 1 had a Ti concentration of 21 at %, an Al concentration of 21 at %, and a C concentration of 58 at %, in which the Ti concentration was the same as the Al concentration. The TiAlC film formed under Condition 2 had a Ti concentration of 29 at %, an Al concentration of 17 at %, and a C concentration of 54 at %, in which the Ti concentration was higher than the Al concentration. The TiAlC film formed under Condition 3 had a Ti concentration of 17 at %, an Al concentration of 31 at %, and a C concentration of 52 at %, in which the Al concentration was higher than the Ti concentration.

The results shown in FIG. 3 revealed that the TiAlC film having the same Al concentration and Ti concentration could be formed by alternately repeating the $TiCl_4$ gas supply and the TMA gas supply without performing $H_2$ plasma processing (Condition 1). Further, the results shown in FIG. 3 revealed that the TiAlC film having a low Al concentration (Al concentration<Ti concentration) could be formed by performing $H_2$ plasma processing after the TMA gas supply and before the $TiCl_4$ gas supply (Condition 2). Further, the results shown in FIG. 3 revealed that the TiAlC film having a high Al concentration (Al concentration>Ti concentration)

could be formed by performing $H_2$ plasma processing after the $TiCl_4$ gas supply and before the TMA gas supply (Condition 3).

From the above results, in forming the TiAlC film by repeating the cycle of $TiCl_4$ gas supply, purge, TMA gas supply, and purge in this order, it was revealed that the compositions of Ti and Al in the TiAlC film could be controlled by changing the timing of $H_2$ plasma processing.

In the above embodiment, the $TiCl_4$ gas is an example of a first precursor gas, the TMA gas is an example of a second precursor gas, and the $H_2$ plasma is an example of a reducing agent. Further, in the above embodiment, Ti is an example of a first metal element, Al is an example of a second metal element, and the TiAlC film is an example of a metal carbide film.

It should be considered that the embodiment disclosed this time are illustrative in all respects and not restrictive. The above embodiment may be omitted, substituted, or modified in various ways without departing from the appended claims and the gist thereof.

Although the above embodiment describes the case of using the $TiCl_4$ gas as the first precursor gas, the present disclosure is not limited thereto. For example, as the first precursor gas, in addition to the $TiCl_4$ gas, halogen-containing metal precursor gases that do not contain carbon, such as $TiI_4$, $TiBr_4$, $TaCl_4$, $HfCl_4$, and $ZrCl_4$, can be used.

In the above embodiment, the case of using the TMA gas as the second precursor gas has been described, but the present disclosure is not limited thereto. For example, as the second precursor gas, in addition to the TMA gas, organic aluminum precursor gases such as $EADC[(CH_3CH_2)AlCl_2]$, $DEAC[(CH_3CH_2)_2AlCl]$, $EASC[(CH_3CH_2)_{1.5}AlCl_{1.5}]$, $DMAC[(CH_3)_2AlCl]$, $DIBAH[((CH_3)_2CHCH_2)_3AlH]$, $TIBA[((CH_3)_2CHCH_2)_3Al]$, $DMAH[(CH_3)_2AlH]$, TDMA $[((CH_3)_3Al)_2—(CH_3)_2AlH]$, $TEAL[(CH_3CH_2)_3Al]$, and $TTBA[Al(C(CH_3)_3)_3]$, can be used. Further, for example, as the second precursor gas, instead of the organic aluminum precursor gas, other organic metal precursor gases containing a metal element different from that of the first precursor gas and containing carbon can be used. Further, when a process temperature in the TMA gas supplying step S13 is 450 degrees C. or less, it is preferable to use Cl-free organic aluminum precursor gases such as TMA, DIBAH, TIBA, DMAH, TDMA, TEAL, and TTBA.

In the above embodiment, the case of using the $H_2$ plasma, which is obtained by plasma-activating the $H_2$ gas, as the reducing agent, has been described, but the present disclosure is not limited thereto. For example, as the reducing agent, deuterium gas ($D_2$ gas) plasma activated by plasma may be used, or a flow of plasma-free $NH_3$ gas, hydrazine gas ($N_2H_4$ gas), monomethylhydrazine gas ($N_2H_3CH_3$ gas) or dimethylhydrazine gas ($N_2H_2(CH_3)_2$ gas) may be used.

In the above embodiment, the case where the film forming apparatus is a single-wafer type apparatus that processes substrates one by one has been described, but the present disclosure is not limited thereto. For example, the film forming apparatus may be a batch-type apparatus that processes a plurality of substrates at a time. Further, for example, the film forming apparatus may be a semi-batch-type apparatus that processes a plurality of substrates, in which the plurality of substrates arranged on a rotary table in a process container is revolved by the rotary table and are sequentially passed through a region into which a first gas is supplied and a region into which a second gas is supplied.

This international application is based upon and claims the benefit of priority from Japanese Patent Application No. 2020-163170, filed on Sep. 29, 2020, the entire contents of which are incorporated herein by reference.

EXPLANATION OF REFERENCE NUMERALS

1: film forming apparatus, 2: process container, 5: gas supplier, 90: controller

What is claimed is:

1. A film forming method for forming a metal carbide film on a substrate, comprising:
   forming a metal carbide film including a first metal element and a second metal element different from the first metal element on the substrate by performing a cycle multiple times in a time-sharing manner, the cycle including:
   supplying a first precursor gas including the first metal element and not including carbon to the substrate;
   supplying a second precursor gas including the second metal element and including carbon to the substrate; and
   supplying a reducing agent to the substrate,
   wherein concentrations of the first metal element and the second metal element included in the metal carbide film are controlled by adjusting the order of the supplying the first precursor gas, the supplying the second precursor gas, and the supplying the reducing agent, and
   wherein the concentrations of the first metal element and the second metal element are controlled such that the concentration of the first metal element is higher than the concentration of the second metal element by performing the supplying the first precursor gas, the supplying the second precursor gas, and the supplying the reducing agent in this order, or
   such that the concentration of the first metal element is lower than the concentration of the second metal element by performing the supplying the first precursor gas, the supplying the reducing agent, and the supplying the second precursor gas in this order.

2. The film forming method of claim 1, wherein the first precursor gas is a halogen-containing metal precursor gas.

3. The film forming method of claim 2, wherein the second precursor gas is an organic aluminum precursor gas.

4. The film forming method of claim 3, wherein the supplying the reducing agent includes activating the reducing agent with plasma.

5. The film forming method of claim 1, wherein the second precursor gas is an organic aluminum precursor gas.

6. The film forming method of claim 1, wherein the supplying the reducing agent includes activating the reducing agent with plasma.

* * * * *